(12) United States Patent
Fukui et al.

(10) Patent No.: US 8,771,873 B2
(45) Date of Patent: *Jul. 8, 2014

(54) LITHIUM SECONDARY BATTERY AND METHOD OF MANUFACTURING THE SAME

(75) Inventors: Atsushi Fukui, Moriguchi (JP); Hiroshi Minami, Moriguchi (JP); Mariko Torimae, Moriguchi (JP); Yasuyuki Kusumoto, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1251 days.

This patent is subject to a terminal disclaimer.

(21) Appl. No.: 11/771,552

(22) Filed: Jun. 29, 2007

(65) Prior Publication Data

US 2008/0124631 A1    May 29, 2008

(30) Foreign Application Priority Data

Jun. 30, 2006  (JP) ................. 2006-182019
Mar. 28, 2007  (JP) ................. 2007-083624

(51) Int. Cl.
*H01M 4/13*    (2010.01)

(52) U.S. Cl.
USPC ............. 429/218.1; 429/231.1; 429/231.3; 429/223; 429/224; 429/232; 429/231.8

(58) Field of Classification Search
USPC ....... 429/218.1, 231.1, 231.3, 223, 224, 232, 429/231.8
See application file for complete search history.

(56) References Cited

U.S. PATENT DOCUMENTS

| | | | |
|---|---|---|---|
| 7,297,446 B2 | 11/2007 | Fukui et al. | |
| 7,378,041 B2 | 5/2008 | Asao et al. | |
| 7,425,285 B2 | 9/2008 | Asao et al. | |
| 7,597,997 B2 | 10/2009 | Sato et al. | |
| 7,682,744 B2 * | 3/2010 | Sawa et al. ............ | 429/218.1 |

FOREIGN PATENT DOCUMENTS

| | | | |
|---|---|---|---|
| CN | 1534813 A | | 10/2004 |
| JP | 60-037655 A | | 2/1985 |
| JP | 2000-021412 | * | 1/2000 |
| JP | 2000-243395 A | | 9/2000 |
| JP | 2000-248230 A | | 9/2000 |
| JP | 2003-331828 A | | 11/2003 |
| JP | 2004-311428 A | | 11/2004 |
| JP | 2005-11802 A | | 1/2005 |
| JP | 2006-120612 A | | 5/2006 |
| WO | 2004-004031 A1 | | 1/2004 |

OTHER PUBLICATIONS

Chinese Office Action dated Jul. 16, 2010, issued in corresponding Chinese Patent Application No. 200710109513.6.
Japanese Office Action dated Jan. 8, 2013, issued in corresponding Japanese Patent Application No. 2007-083624 (5 pages).
Chinese Office Action dated Jul. 22, 2011, issued in corresponding Chinese Patent Application No. 200710109513.6.

* cited by examiner

*Primary Examiner* — Laura Weiner
(74) *Attorney, Agent, or Firm* — Westerman, Hattori, Daniels & Adrian, LLP

(57) ABSTRACT

A lithium secondary battery includes an electrode assembly having a positive electrode (1), a negative electrode (2) having a negative electrode current collector and a negative electrode active material layer formed on a surface of the negative electrode current collector and composed of a binder and negative electrode active material particles containing silicon and/or a silicon alloy, and a separator (3) interposed between the electrodes. The electrode assembly is impregnated with a non-aqueous electrolyte. The binder contains a polyimide resin represented by the following chemical formula (1):

Chemical Formula (1)

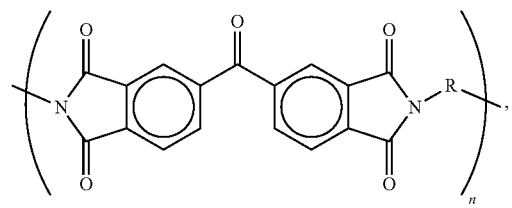

where R contains at least a benzene ring, and n is within the range of from 10 to 100,000, and the negative electrode active material particles have an average particle size of 5 μm or greater.

13 Claims, 4 Drawing Sheets

LITHIUM SECONDARY BATTERY AND METHOD OF MANUFACTURING THE SAME

BACKGROUND OF THE INVENTION

1. Field of the Invention

The present invention relates to lithium secondary batteries and methods of manufacturing the batteries.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, lithium-ion batteries that perform charge and discharge by transferring lithium ions between the positive and negative electrodes have been widely used as the driving power sources for the mobile information terminal devices.

The mobile information terminal devices tend to have higher power consumption as the functions of the devices, such as moving picture playing functions and gaming functions. It is strongly desired that the lithium-ion batteries that are the drive power source for the devices have further higher capacities and higher performance in order to achieve longer battery life and improved output power. In view of these circumstances, attempts have been made to use a silicon alloy and a tin alloy, which can absorb a large amount of lithium per unit volume, as the negative electrode active material so that the discharge capacity of the lithium secondary battery can be increased.

The lithium secondary battery that uses the above-described negative electrode active material, however, suffers from the expansion and shrinkage of the negative electrode active material that are associated with charge-discharge operations. This results in fractures of the binder resin, which binds the negative electrode active material together inside the negative electrode active material layer and joins the negative electrode active material with the negative electrode current collector, and peeling-off of the negative electrode active material and the negative electrode current collector at the interfaces with the binder resin. Therefore, a problem has been that the current collection structure is broken within the negative electrode, resulting in degradation of electron conductivity inside the negative electrode and poor cycle performance.

In view of the problem, it has been proposed to use a high-strength polymer such as polyimide as the binder of the negative electrode (see, for example, WO 2004/004031).

Even when the just-mentioned conventional polyimide resin is used as the binder, the adhesion and the strength of the resin have still been insufficient. Thus, the initial charge-discharge efficiency and the cycle performance have not been improved sufficiently. Therefore, there exists a need for improvements.

In view of the foregoing, it is a principal object of the present invention to provide a lithium secondary battery that can inhibit fractures of the binder resin and peeling-off of the negative electrode active material and the negative electrode current collector at the interfaces with the binder resin even when charge-discharge operations are performed repeatedly, so that the electron conductivity within the negative electrode can be prevented from deterioration and the cycle performance can be improved. It is another principal object of the invention to provide a method of manufacturing such a battery.

Accordingly, it is an object of the present invention to provide a lithium secondary battery that shows good cycle performance and also achieves high energy density even with the use of silicon particles and the like as the negative electrode active material, and to provide a method of manufacturing such a battery.

SUMMARY OF THE INVENTION

In order to accomplish the foregoing and other objects, the present invention provides a lithium secondary battery comprising: a positive electrode; a negative electrode comprising a negative electrode current collector and a negative electrode active material layer formed on the negative electrode current collector, the negative electrode active material layer comprising a binder and negative electrode active material particles containing silicon particles and/or silicon alloy particles; and a separator interposed between the electrodes; an electrode assembly comprising the positive electrode, the negative electrode, and the separator; and a non-aqueous electrolyte impregnated in the electrode assembly, wherein: the binder contains a polyimide resin represented by the following chemical formula (1), and the silicon particles and the silicon alloy particles have an average particle size of 5 µm or greater.

Chemical Formula (1)

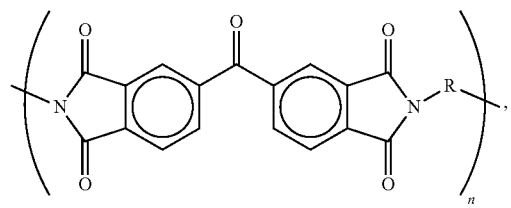

(In the formula, R contains at least a benzene ring, and n is within the range of from 10 to 100000.)

The present invention makes it possible to inhibit fractures of the binder resin and peeling-off of the negative electrode active material and the negative electrode current collector at the interfaces with the binder resin. Thereby, the electron conductivity within the negative electrode does not deteriorate, and as a result, the cycle performance significantly improves.

DETAILED DESCRIPTION OF THE INVENTION

Figure 1:
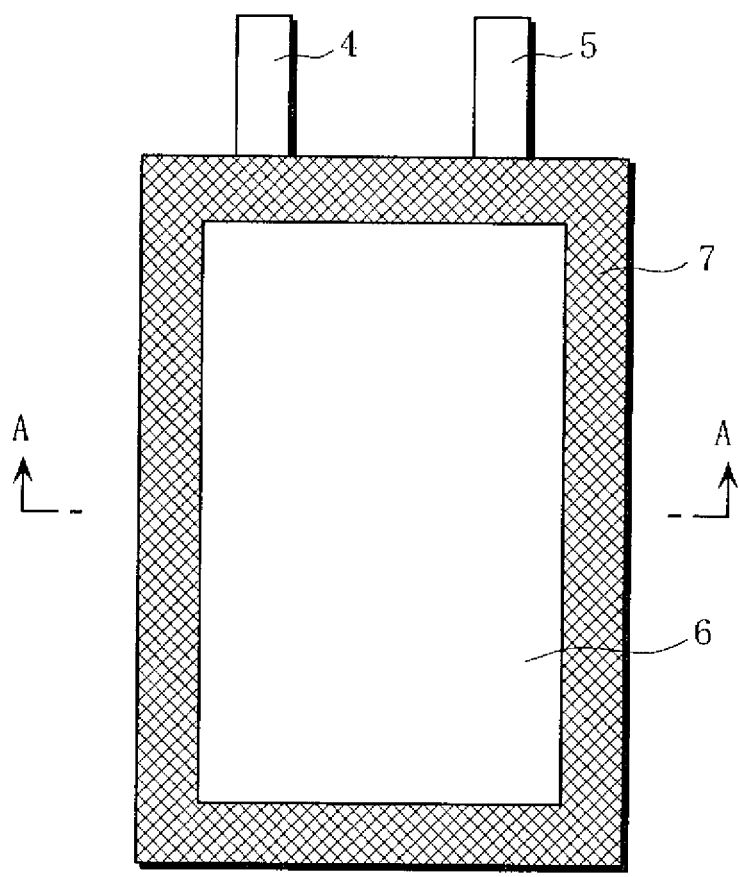
FIG. 1 is a front view of the battery according to one embodiment of the present invention.

A lithium secondary battery according to the present invention comprises: a positive electrode; a negative electrode comprising a negative electrode current collector and a negative electrode active material layer formed on the negative electrode current collector, the negative electrode active material layer comprising a binder and negative electrode active material particles containing silicon particles and/or silicon alloy particles; and a separator interposed between the electrodes; an electrode assembly comprising the positive electrode, the negative electrode, and the separator; and a non-aqueous electrolyte impregnated in the electrode assembly. The binder contains a polyimide resin represented by the following chemical formula (1), and the silicon particles and the silicon alloy particles have an average particle size of 5 μm or greater.

Chemical Formula (1)

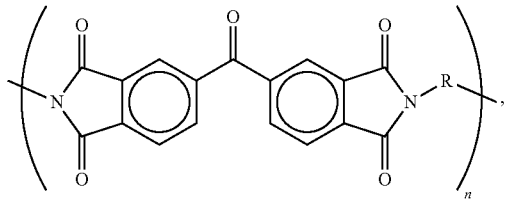

(In the formula, R contains at least a benzene ring, and n is within the range of from 10 to 100,000.)

The average particle size of the silicon particles and the silicon alloy particles (hereinafter also collectively referred to as "silicon particles and the like") is controlled to be 5 μm or greater for the following reason. If the average particle size is excessively small, the specific surface area per weight becomes accordingly large, and the alteration area of the silicon particles and the like due to the charge-discharge reactions becomes large.

On the other hand, if the particle size of the silicon particles and the like becomes large, the absolute magnitude of the expansion and shrinkage of the silicon particles themselves increases. For this reason, when the conventional polyimide resin is used as the binder, fractures of the binder itself and peeling-off of the negative electrode active material particles and the negative electrode current collector at the interfaces with the binder occur because the strength and binding performance of the binder itself is insufficient, resulting in breakage of the current collection structure within the negative electrode active material layer. Nevertheless, when the binder contains a polyimide resin represented by Chemical Formula (1), the strength of the binder itself and its binding performance improve remarkably, and therefore, it becomes possible to inhibit the fractures of the binder itself and the peeling-off of the negative electrode active material particles and the negative electrode current collector at the interfaces with the binder. As a result, alteration of the silicon particles and the like is hindered, and at the same time, the electron conductivity within the negative electrode is prevented from deteriorating even when charge-discharge operations are performed repeatedly. Therefore, the cycle performance of the battery can be improved.

It should be noted that average particle size of silicon particles and the like was obtained by laser diffraction analysis.

Here, it is desirable that R in the chemical formula (1) be a functional group represented by the following chemical formula (2) or (3):

Chemical Formula (2)

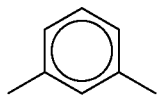

Chemical Formula (3)

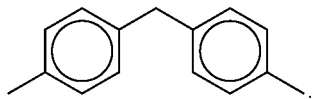

When the R portion of Chemical Formula (1) has a structure that links a benzene ring or benzene rings, the molecular structure becomes rigid, making it possible to obtain a resin with a higher strength. Accordingly, the cycle performance of the battery can be improved further.

It is desirable that the polyimide resin represented by the chemical formula (1) have a molecular weight of 100,000 or less.

When the molecular weight increases, the molecular chain correspondingly becomes longer, so the resin continuously exists in the negative electrode active material layer. This means that the binder is present in such a state as to cover the surfaces of the negative electrode active material particles, reducing the surface area of the negative electrode active material that comes into contact with the non-aqueous electrolyte, and also reducing the contact points of the negative electrode active material particles with one another and the contact points between the negative electrode current collector and the negative electrode active material particles. Consequently, the lithium ion conductivity and electron conductivity within the negative electrode active material layer become poor, and electrochemical polarization in the negative electrode active material layer becomes greater during discharge. As a consequence, even if the battery is discharged at the same current value, the discharge capacity becomes less because of the voltage drop due to the electrochemical polarization.

In contrast, when the molecular weight is small (specifically, when the molecular weight is 100,000 or less, as described above), the continuous presence of the resin within the negative electrode active material layer can be prevented, and therefore, the binding structure between the negative electrode active material particles and between the negative electrode current collector and the negative electrode active material particles results in what is called a point binding structure. This prevents the negative electrode binder resin from covering the negative electrode active material particle surfaces in the negative electrode active material layer, making it possible to inhibit the decrease of the area of the negative electrode active material surface that comes into contact with the non-aqueous electrolyte and to inhibit the decrease of the contact points of the negative electrode active material particles with one another and the contact points between the negative electrode current collector and the negative electrode active material particles. This results in an increase in the area of the interfaces between the non-aqueous electrolyte and the negative electrode active material particles, which serve as gateways for lithium ions, improving the lithium ion conductivity and electron conductivity within the negative electrode active material layer. As a result, the uniformity of battery reactions within the negative electrode active material layer and of the negative electrode active material particles improves. As a result, the initial charge-discharge efficiency and discharge capacity of the battery improve.

It should be noted that although the resin represented by the chemical formula (1) has a high strength and therefore shows a sufficient strength even with a relatively low molecular weight, an excessively small molecular weight may cause the strength to be insufficient. For this reason, it is desirable that the molecular weight be 1000 or greater.

It is desirable that the negative electrode current collector have a surface roughness Ra of 0.2 µm or greater.

When the negative electrode current collector surface has a surface roughness Ra of 0.2 µm or greater, the contact area between the binder resin and the negative electrode current collector surface is large so that the binder resin gets into the surface irregularities of the negative electrode current collector, exerting an anchoring effect. As a result, deterioration of the current collection performance in the negative electrode active material layer is lessened. However, if the negative electrode current collector surface has an excessively great surface roughness Ra, the processing hour for manufacturing the negative electrode current collector increases (for example, the plating time becomes longer), a problem arises that the manufacturing cost of the battery rises. Therefore, it is desirable that the surface roughness Ra be 2 µm or less.

Surface roughness Ra is defined in Japanese Industrial Standards JIS B 0601-1994, which will be detailed later.

It is desirable that the negative electrode current collector be selected from the group consisting of a copper foil, a copper alloy foil, a metal foil having a copper layer formed on its surface, and a metal foil having a copper alloy layer formed on its surface.

When the negative electrode current collector surface is made of copper, which has high electron conductivity, the uniformity in battery reactions within the negative electrode active material layer improves.

It is desirable that the positive electrode contain a lithium-transition metal composite oxide as a positive electrode active material.

When the positive electrode active material contains a lithium-transition metal composite oxide, an increase in the battery capacity and an improvement in the cycle performance can be achieved. It is particularly preferable to use a positive electrode active material represented by the chemical formula $Li_aNi_xMn_yCo_zO_2$ (wherein $0 \le a \le 1$, $x+y+z=1$, $0 \le x \le 1$, $0 \le y \le 1$, and $0 \le z \le 1$) as the lithium-transition metal composite oxide.

It is desirable that the theoretical electrical capacity ratio of the positive electrode to the negative electrode be 1.2 or less.

Restricting the theoretical electrical capacity ratio of the positive electrode to the negative electrode to 1.2 or less, as in the just-described configuration, means a smaller amount of lithium that can be charged and discharged per 1 atom of silicon, making it possible to reduce the amount of change in volume per each of the negative electrode active material particles. As a result, the fracture of the negative electrode active material caused by charge-discharge operations lessens, and therefore, it becomes possible to further prevent the contact area between the non-aqueous electrolyte and the new surfaces in the negative electrode active material from increasing. The theoretical electrical capacity ratio can be determined by the later-described equation (3).

If the theoretical electrical capacity ratio of the positive electrode to the negative electrode is too small, the ratio of the amount of the positive electrode active material to the amount of the negative electrode active material in the electrode assembly is too low (the proportion of the positive electrode active material is too small in the electrode assembly) to achieve a high energy density battery. Therefore, it is desirable that the theoretical electrical capacity ratio of the positive electrode to the negative electrode be 0.4 or greater.

It is desirable that the silicon particles and the like have an average particle size of 25 µm or less.

In the lithium secondary battery employing a carbon material such as graphite as the negative electrode active material, the thickness of the negative electrode active material layer formed on one side of the negative electrode current collector is approximately from 60 µm to 100 µm. When using a positive electrode similar to such a negative electrode active material using a carbon material (i.e., a positive electrode having the same thickness, in other words, a positive electrode having the same capacity) in a lithium secondary battery, it is desirable to control the thickness of the negative electrode active material layer to 40 µm or less per one side of the electrode in order to obtain a high capacity battery. Accordingly, it is necessary to control the particle size of the silicon particles, which are used as the negative electrode active material particles according to the present invention, to be 40 µm or less. However, merely controlling the particle size of the silicon particles (or the silicon alloy particles) to 40 µm or less is insufficient. If silicon particles with a particle size of 25 µm or greater are contained in the negative electrode active material in a large amount, defects such as streaks and scratches occur when coating the electrode. For this reason, it is preferable that the average particle size of the silicon particles and the like be controlled to 25 µm or less.

It is desirable that the silicon particles and the like have a crystallite size of 100 nm or less.

When the silicon particles and the like have a crystallite size of 100 nm or less, a large number of crystallites exist in a particle because of the small crystallite size. This means that the surface of each of the silicon particles and the like has a large number of crystallite surfaces, resulting in small surface irregularities in the surface of each of the silicon particles and the like. When the surfaces of the silicon particles and the like have such small irregularities, the negative electrode binder gets into such irregular portions, exerting an anchoring effect. Therefore, adhesion of the silicon particles and the like with one another further improves. Especially, since the above-described binder precursor has a low viscosity, it can get into the surface irregularities of the silicon particles and the like deeply. Thus, the anchoring effect becomes more significant, and the adhesion between the negative electrode active material particles improves greatly. As a result, excellent charge-discharge characteristics can be obtained.

In addition, when the silicon particles and the like have a crystallite size of 100 nm or less, there exist a large number of crystallites in a particle and there exist a large number of grain boundaries inside each of the silicon particles and the like because of the small crystallite size relative to the particle size. Therefore, lithium ions tend to move into the interior of the silicon particles and the like more easily, enhancing the uniformity of the reactions in the silicon particles and the like significantly. Thus, the fracture of the negative electrode active material particles is prevented. Accordingly, new surfaces that are highly reactive with the non-aqueous electrolyte solution do not grow in a large number during the charge-discharge reactions, preventing the expansion associated with the alteration of the silicon particles and the like originating from the new surfaces that is due to the side reactions with the non-aqueous electrolyte solution. Therefore, the charge-discharge cycle performance improves further.

It is desirable that the silicon particles and the like have a crystallite size of 1 nm or greater. The reason is that the silicon particles and the like that have a crystallite size of less than 1 nm are difficult to prepare even with the later-described thermal decomposition and so forth of a silane compound.

It is desirable that the silicon particles and the like be prepared by thermal decomposition or thermal reduction of a material containing a silane compound.

The reason why it is preferable to use the silicon particles and the like prepared by thermal decomposition or thermal reduction is that the use of such methods makes it easy to obtain silicon particles and the like having a crystallite size of 100 nm or less.

Herein, the term "thermal decomposition" refers to a method of depositing silicon by thermally decomposing a material containing a silane compound such as trichlorosilane ($SiHCl_3$), monosilane ($SiH_4$), and disilane ($Si_2H_6$). The term "thermal reduction" refers to a method of depositing silicon by thermally decomposing a material containing a silane compound such as trichlorosilane ($SiHCl_3$), monosilane ($SiH_4$), and disilane ($Si_2H_6$) under a reducing atmosphere.

It is desirable that the silicon particles and the like are prepared by pulverizing an ingot of silicon and/or a silicon alloy that is/are prepared by thermally decomposing or thermally reducing a material containing a silane compound, and classifying the pulverized material.

When grain boundaries exist in a silicon ingot, mechanical pulverization of the ingot results in fractures along the grain boundaries. The silicon ingot prepared by thermal decomposition or thermal reduction, which has a small crystallite size, have a large number of grain boundaries. Therefore, if the pulverization is carried out to the particles with an average particle size of 5 μm to 25 μm, which is preferable for the present invention, a large number of grain boundary surfaces appear at the particles surface, so the particles surface has such a shape with an extremely large number of irregularities. Thus, since the anchoring effect becomes more significant, the adhesion between the negative electrode active material particles improves remarkably, achieving extremely good charge-discharge characteristics.

It is desirable that the silane compound be monosilane ($SiH_4$) or trichlorosilane ($SiHCl_3$). Monosilane is especially desirable.

In order to produce silicon particles and the like with a small crystallite size, it is preferable that the temperature at which a silane compound is thermally decomposed be as low as possible. The reason is that the lower the temperature of the thermal decomposition is, the more likely the particles with a small crystallite size tend to be produced. Here, when trichlorosilane ($SiHCl_3$) is used as the source material for the thermal decomposition or the thermal reduction, the minimum temperature necessary for the thermal decomposition with which the silicon particles and the like can be deposited appropriately is about 900° C. to 1000° C., while when monosilane ($SiH_4$) is used, the minimum temperature is about 600° C. to 800° C. Thus, the temperature of the thermal decomposition is not very high for both of them, so both are suitable for preparing silicon particles and the like with a small crystallite size. The use of monosilane is particularly preferable because the deposition of the silicon particles and the like is possible at an even lower temperature.

It is desirable that the negative electrode active material layer contain 3 weight % to 20 weight %, based on the weight of the negative electrode active material, of graphite powder having an average particle size of from 3 μm to 15 μm.

When the negative electrode active material layer contains graphite powder, the electron conductivity in the negative electrode active material layer improves because a conductive network is formed in the negative electrode active material layer, and the uniformity of the reactions between the negative electrode active material particles (including the case in which two or more kinds of negative electrode active material particles are mixed together) improves. As a result, the uniformity of changes in volume of the negative electrode active material particles associated with the charge-discharge reactions improves. Therefore, it becomes possible to reduce the strain in the negative electrode active material layer that occurs due to charge-discharge operations, to prevent the fractures of the binder, and to improve charge-discharge characteristics.

In addition, since the above-described binder precursor has a low viscosity, the binder gets into the surface irregularities of the graphite particle, and the adhesion between the binder and the graphite particles improves due to the anchoring effect of the binder and the graphite particles. In particular, the surface portion of the graphite particle where the edge portions along the c-axis of the stacked graphite crystal planes are exposed contributes to an improvement in the adhesion significantly, because it has greater surface irregularities than the surface portion thereof where the crystal planes are exposed. Therefore, a more significant anchoring effect can be obtained, which improves the adhesion between the binder and the graphite. Thus, the binder of the present invention shows not only the adhesion with the negative electrode active material particles but also the adhesion with the graphite. Therefore, the addition of graphite powder does not deteriorate the adhesion within the negative electrode active material layer. Thus, it becomes possible to obtain good charge-discharge characteristics since the effect of improving the electron conductivity obtained by the addition of graphite powder can be exhibited sufficiently within the negative electrode active material layer.

The average particle size of the graphite powder is restricted to be from 3 μm to 15 μm for the following reason.

If the average particle size of graphite powder is less than 3 μm, the total surface area of the graphite powder contained in the negative electrode active material layer is large, so the amount of the negative electrode binder that exists on the graphite powder surface is large while the amount of the negative electrode binder that exists on the negative electrode active material surface is correspondingly small. As a consequence, the binding effect originating from the negative electrode binder becomes poor, resulting in poor charge-discharge cycle performance. On the other hand, if the average particle size of the graphite powder exceeds 15 μm, the number of the graphite powder particles per weight is so small that a sufficient conductive network cannot be formed in the negative electrode active material layer, and the effect of improving reaction uniformity cannot be fully exhibited.

The amount of graphite powder based on the total amount of the negative electrode active material is controlled to be from 3 weight % to 20 weight % for the following reason.

If the amount of the graphite powder added is less than 3 weight %, the amount of the graphite powder is so small that a conductive network cannot be formed sufficiently in the negative electrode active material layer and the effect of improving reaction uniformity cannot be fully exhibited. On the other hand, if the amount of the graphite powder added exceeds 20 weight %, the binding effect on the negative electrode active material originating from the negative electrode binder is poor, resulting in poor charge-discharge cycle performance, because the amount of the negative electrode binder that exists on the graphite powder surface is large while the amount of the negative electrode binder that exists on the negative electrode active material surface becomes correspondingly small.

It is desirable that the negative electrode active material particles comprise silicon particles having a purity of 95 weight % or greater.

When using silicon particles as the negative electrode active material particles and controlling the silicon particles to have a purity of 95 weight % or greater, the amount of the silicon that is involved in the charge-discharge operation increases. As a result, the capacity of the negative electrode can be increased.

It is preferable that the silicon particles contain oxygen and, as an impurity, at least one element selected from the group consisting of phosphorus, boron, aluminum, iron, calcium, sodium, gallium, lithium, and indium.

When at least one of the just-mentioned impurities is contained in the silicon particles, the electron conductivity of the silicon particles is improved. Therefore, the current collection performance within the negative electrode active material layer improves, and the uniformity of the electrode reaction also improves. It should be noted that oxygen is included in addition to the impurities such as phosphorus because oxygen is unavoidably present because of the surface oxidation of silicon.

Among the impurities, phosphorus and boron are particularly preferable. Phosphorus and boron can form a solid solution with silicon up to an amount of several hundred ppm, and when a solid solution forms in that way, the electron conductivity in the silicon particles further improves. Such silicon in which phosphorus or boron is dissolved in solid solution may be preferably formed by adding a phosphorus source or a boron source, such as phosphine ($PH_3$) or diborane ($B_2H_6$), in an appropriate amount to a silane compound that is a source material of the thermal decomposition or the thermal reduction.

The present invention also provides a method of manufacturing a lithium secondary battery, comprising the steps of: dispersing negative electrode active material particles containing silicon particles and/or silicon alloy particles in a solution containing a binder precursor to prepare a negative electrode active material slurry; applying the negative electrode active material slurry onto a surface of a negative electrode current collector; heat-treating the negative electrode current collector on which the negative electrode active material slurry is applied under a non-oxidizing atmosphere to polymerize the binder precursor, so as to prepare a negative electrode containing as a binder a polyimide resin represented by the following chemical formula (1); interposing a separator between the negative electrode and the positive electrode to prepare an electrode assembly; and impregnating the electrode assembly with a non-aqueous electrolyte.

Chemical Formula (1)

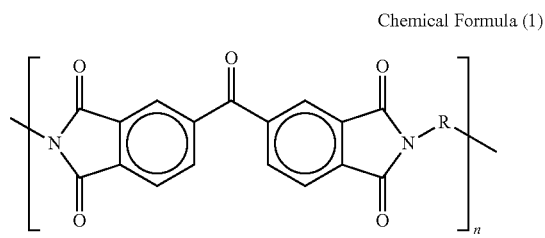

(In the formula, R contains at least a benzene ring, and n is within the range of from 10 to 100,000.)

The above-described lithium secondary battery may be fabricated in this manner.

It is desirable that R in the chemical formula (1) be a functional group represented by the following chemical formula (2) or (3):

Chemical Formula (2)

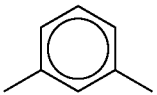

Chemical Formula (3)

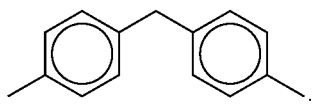

The reason is as follows. When the R portion of Chemical Formula (1) has a structure that links a benzene ring or benzene rings, the molecular structure becomes rigid, making it possible to obtain a resin with a higher strength. Therefore, the cycle performance can be improved further.

It is desirable that the binder precursor comprise a mixture of a diamine component and an esterified product of an acid anhydride component by an alcohol.

When using a mixture of a diamine component and an esterified product of an acid anhydride component by an alcohol (varnish of monomer components of polyimide resin) as the binder precursor, the binder easily gets into the surface irregularities in the surfaces of the negative electrode active material particles because the mixture has a lower viscosity than that in a polymer state. As a result, the anchoring effect between the binder and the negative electrode active material particles becomes more significant, making it possible to obtain a higher level of adhesion. Especially when the silicon particles and the like have a crystallite size of 100 nm or less, very small surface irregularities numerously exist in the surfaces, and therefore the effect of improving adhesion is remarkably high.

It is desirable that the heat-treating is conducted at a temperature higher than the glass transition temperature of the polyimide resin.

When the heat-treating step is conducted at a temperature that exceeds the glass transition temperature of the polyimide resin, the polymerization of the binder precursor and the following production of a polyimide resin by an imidization reaction, and thereafter, the polyimide resin becomes a plastic region. Thus, the polyimide resin gets into the surface irregularities of the negative electrode active material particles to a greater degree (the thermal bonding effect of the polyimide is exerted, and the anchoring effect is exhibited more significantly), and a greater level of adhesion can be obtained.

It is desirable that R in the chemical formula (1) be a functional group represented by the following chemical formula (2), and the temperature of the heat-treating is within the range of from 300° C. to 450° C.

The glass transition temperature of the polyimide resin in which R in the chemical formula (1) is a functional group represented by the chemical formula (2) is 300° C. Accordingly, it becomes possible to obtain an improvement of the adhesion resulting from the thermal bonding effect of the polyimide resin by conducting the heat treatment at 300° C. or higher.

On the other hand, the upper limit of the heat-treating temperature is set at 450° C. for the following reason. If the heat-treating temperature exceeds 450° C., the binder represented by the chemical formula (1), which is the binder according to the present invention, undergoes thermal decomposition greatly, deteriorating the strength of the binder considerably, so that the adhesion of the negative electrode active material particles with one another deteriorates, resulting in poor charge-discharge characteristics.

It is desirable that R in the chemical formula (1) be a functional group represented by the following chemical formula (3), and the temperature of the heat-treating is within the range of from 275° C. to 450° C.

The glass transition temperature of the polyimide resin in which R in the chemical formula (1) is a functional group represented by the chemical formula (3) is 275° C. Accordingly, it becomes possible to obtain an improvement of the adhesion resulting from the thermal bonding effect of the polyimide resin by conducting the heat treatment at 275° C. or higher.

On the other hand, the upper limit of the heat-treating temperature is set at 450° C. for the same reason as described above.

It is desirable that the silicon particles and the like be prepared by thermal decomposition or thermal reduction of a material containing a silane compound. It is desirable that the silicon particles and the like are prepared by pulverizing an ingot of silicon and/or a silicon alloy that is/are prepared by thermally decomposing or thermally reducing a material containing a silane compound, and classifying the pulverized material. In addition, it is desirable that the silane compound be monosilane ($SiH_4$) and/or trichlorosilane ($SiHCl_3$).

The reasons are the same as described above.

DESCRIPTION OF PREFERRED EMBODIMENTS

Hereinbelow, the present invention is described in further detail based on certain embodiments and examples thereof. It should be construed, however, that the present invention is not limited to the following embodiments and examples, but various changes and modifications are possible without departing from the scope of the invention.

Preparation of Negative Electrode

A monocrystalline silicon ingot was pulverized and classified to obtain monocrystalline silicon powder (average particle size: 20 μm) having a purity of 99% as a material for the negative electrode active material. 90 weight % of the monocrystalline silicon powder and 10 weight % of a binder resin represented by the following chemical formula (4) (which has a weight average molecular weight of 50,000 and is hereafter also referred to as a "binder resin A") were mixed with a binder precursor solution a, to thus prepare a negative electrode active material slurry. Here, the binder precursor solution a may be made from diethyl ester of 3,3',4,4'-benzophenone tetracarboxylic acid represented by the following chemical formula (5) and m-phenylenediamine represented by the following chemical formula (6). The just-mentioned diethyl ester of 3,3',4,4'-benzophenone tetracarboxylic acid may be prepared by reacting 3,3',4,4'-benzophenone tetracarboxylic dianhydride represented by the following chemical formula (7) with 2 equivalent weight of ethanol in the presence of NMP (n-methyl-2-pyrrolidone).

Chemical Formula (4)

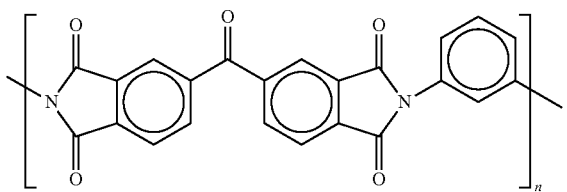

Chemical Formula (5)

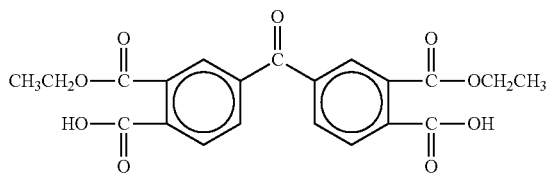

Chemical Formula (6)

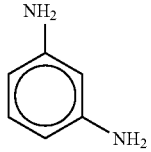

Chemical Formula (7)

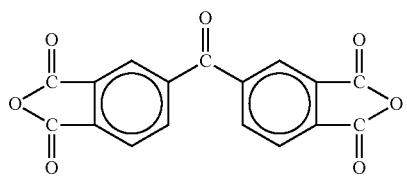

Next, a 18 μm-thick pressure-rolled Corson alloy foil (which was made of a Cu—Ni—Si—Mg alloy containing 96.2 weight % copper, 3.0 weight % Ni, 0.65 weight % Si, 0.15 weight % Mg, and had a tensile strength of 900 N/mm$^2$) was subjected to a roughening process by electrodepositing copper on both sides thereof. Thus, a double-sided roughened alloy foil was prepared as the negative electrode current collector. [The roughened alloy foil had a later-described surface roughness Ra (defined by JIS B 0601-1994) of 0.25 μm and a later-described mean spacing of local peaks S (defined by JIS B 0601-1994) of 0.85 μm]. Subsequently, the negative electrode active material slurry was applied onto both sides of the negative electrode current collector thus prepared in the air at 25° C. and was thereafter dried in the air at 120° C. Further, the resultant article was cut out into a 390 mm×52 mm rectangle shape, and thereafter pressure-rolled in the air at 25° C. Then, the article was heat-treated at 400° C. for 10 hours under an argon atmosphere, whereby a polymerize reaction was effected. Thus, a negative electrode having a binder resin A represented by the chemical formula (4) was prepared. The amount of the negative electrode active material applied was 5.6 mg/cm$^2$.

Definition of Surface Roughness Ra

Figure 3:
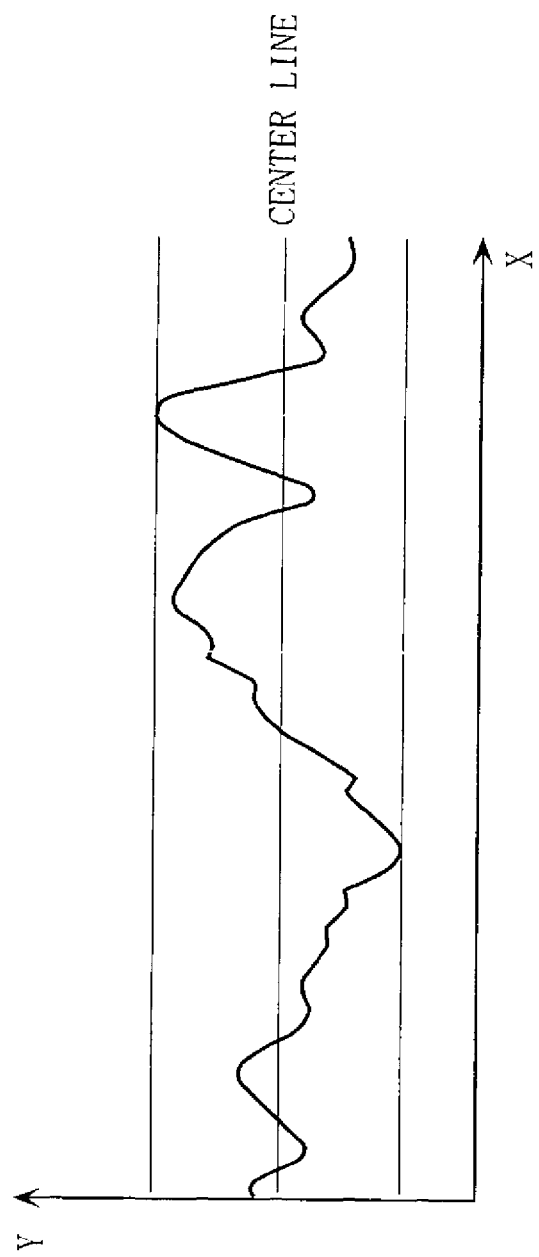
FIG. 3 is a graph for illustrating surface roughness Ra.

Surface Roughness Ra refers to the mean value of the absolute values of the heights of a roughness curve as illustrated in FIG. 3, expressed by the following equation (1), wherein the roughness curve is y=f(x) and L is the length of the roughness curve.

$$Ra = \frac{1}{L}\int_0^L |f(x)|dx \qquad \text{Eq. (1)}$$

Definition of Mean Spacing of Local Peaks S

Figure 4:
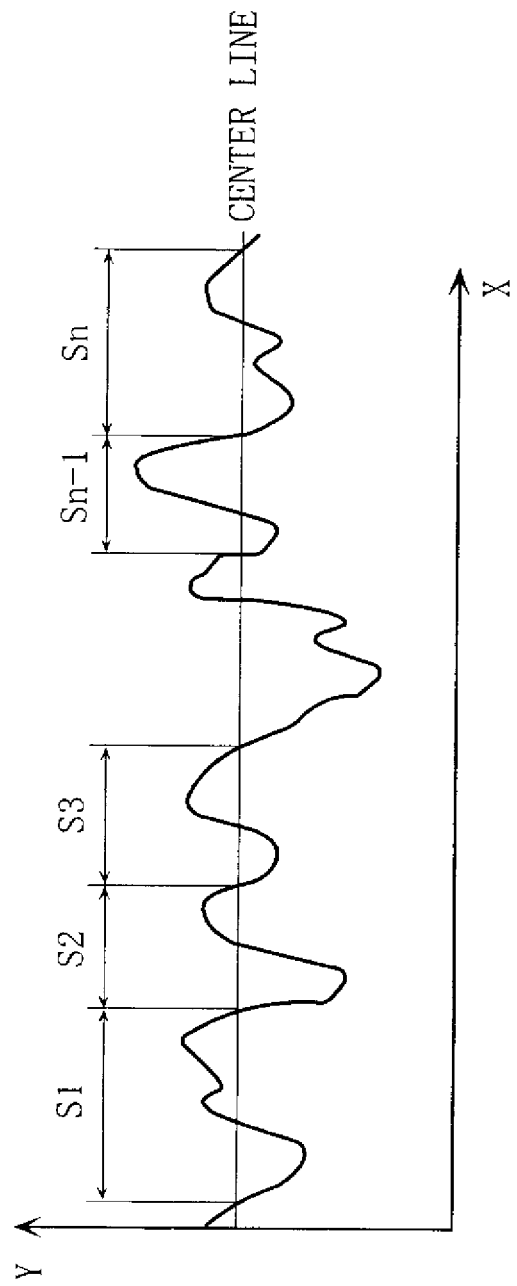
FIG. 4 is a graph for illustrating mean spacing of local peaks S.

Mean spacing of local peaks S refers to the mean value of the spacings between sets of peaks and valleys adjacent to each other in a cross-sectional profile curve as illustrated in FIG. 4, expressed by the following equation (2), wherein the respective spacings of sets of adjacent peaks and valleys are denoted as S1, S2, ..., and Sn.

$$S = \frac{1}{n}\sum_{i=1}^{n} Si \qquad \text{Eq. (2)}$$

Preparation of Positive Electrode

First, a lithium-cobalt composite oxide powder (average particle size: 13 μm, BET specific surface area: 0.35 m²/g) represented as $LiCoO_2$ and a lithium nickel manganese cobalt composite oxide powder (average particle size: 11 μm, BET specific surface area: 0.50 m²/g) represented as $LiNi_{1/3}Mn_{1/3}Co_{1/3}O_2$ were mixed at a weight ratio of 7:3, to prepare a positive electrode active material powder. Next, the just-described positive electrode active material powder, carbon material powder as a positive electrode conductive agent, and polyvinylidene fluoride as a positive electrode binder were added to NMP (N-methyl-2-pyrrolidone) as a dispersion medium so that the weight ratio of the positive electrode active material, the positive electrode conductive agent, and the positive electrode binder became 94:3:3. Thereafter, the mixture was kneaded to prepare a positive electrode mixture slurry.

Next, the resultant positive electrode mixture slurry was applied onto both sides of a positive electrode current collector made of an aluminum foil with a thickness of 15 μm so that the applied area on the obverse side has a length of 340 mm and a width of 50 mm and the applied area on the reverse side has a length of 270 mm and a width of 50 mm. The positive electrode current collector coated with the positive electrode mixture slurry was then dried and pressure-rolled. Thus, a positive electrode active material layer was formed on each side of the positive electrode current collector. The amount of the positive electrode active material applied was 48 mg/cm².

Preparation of Electrolyte Solution $LiPF_6$ was dissolved at a concentration of 1 mol/L into a mixed solvent of 3:7 volume ratio of ethylene carbonate (EC) and diethylene carbonate (DEC), and 0.4 weight % of carbon dioxide gas was added, to thus prepare an electrolyte solution.

Construction of Battery

First, the positive electrode and the negative electrode prepared in the manner described above were wound in a cylindrical form with a porous polyethylene separator interposed therebetween. Next, the cylindrical wound electrode assembly was pressed into a flat shape, and thereafter the flat-shaped electrode assembly and the non-aqueous electrolyte solution were accommodated into a battery case made of aluminum laminate under an argon atmosphere at room temperature and atmospheric pressure. Thus, a lithium secondary battery was prepared.

Figure 2:
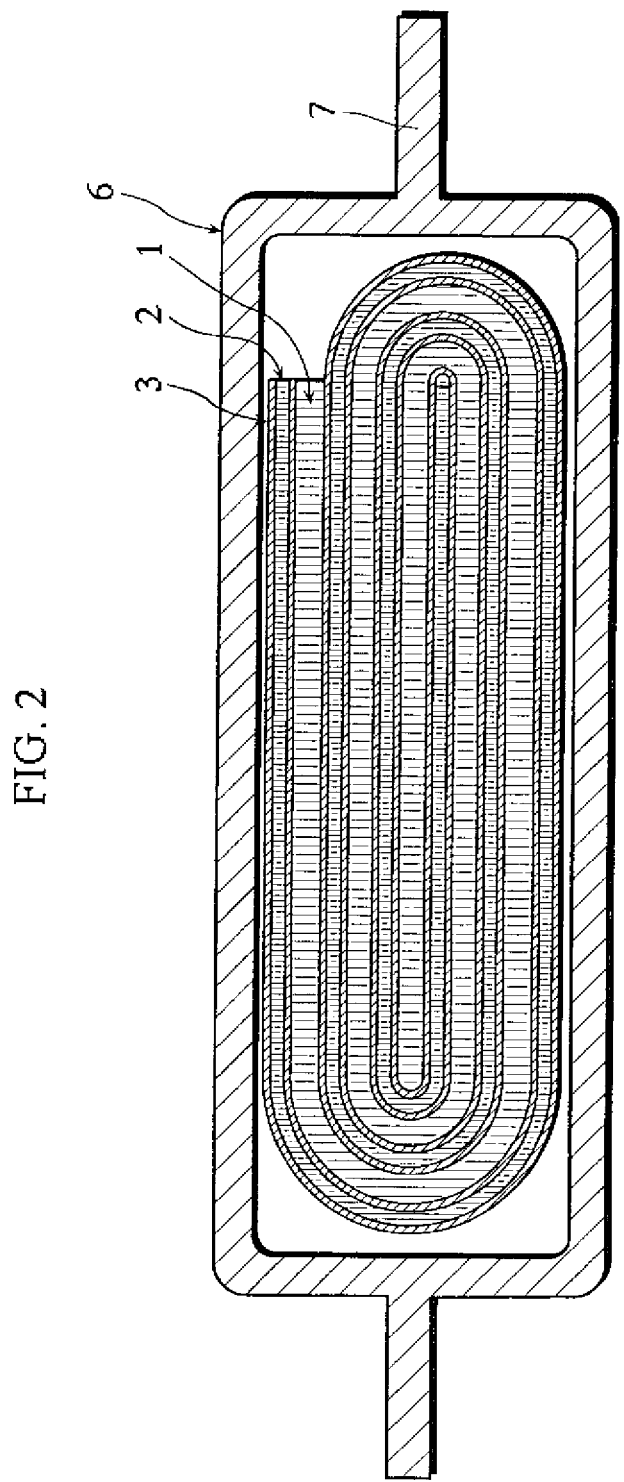
FIG. 2 is a cross-sectional view taken along line A-A in FIG. 1.

The specific structure of the lithium secondary battery is as follows. As illustrated in FIGS. 1 and 2, a positive electrode 1 and a negative electrode 2 are disposed so as to oppose each other across a separator 3, and an electrode assembly comprising the positive electrode 1, the negative electrode 2, and the separator 3 is impregnated with the non-aqueous electrolyte solution. The positive electrode 1 and the negative electrode 2 are connected to a positive electrode current collector tab 4 and a negative electrode current collector tab 5, respectively, forming a structure that enables charging and discharging as a secondary battery. The electrode assembly is disposed in a space within an aluminum laminate battery case 6 having a sealed part 7, at which at which opposing peripheral ends of the aluminum laminate are heat sealed.

EXAMPLES

First Group of Examples

In the First Group of Examples, a study was conducted about the effects of the type of binder resin and the particle size of negative electrode active material on battery performance.

Example A1

A battery prepared in the manner described in the foregoing embodiment was used for Example A1.

The battery fabricated in this manner is hereinafter referred to as Battery A1 of the invention.

Examples A2 to A4

Respective batteries were fabricated in the same manner as described in Example A1 above, except that the average particle sizes of the negative electrode active material particles used were 15 μm, 10 μm, and 5 μm, respectively. Note that the average particle sizes of the negative electrode active material particles were obtained by laser diffraction analysis, as with the method described in the foregoing embodiment. It should also be noted that laser diffraction analysis was used in all the following examples and comparative examples to determine the particle sizes.

The batteries fabricated in this manner are hereinafter referred to as Batteries A2 to A4 of the invention, respectively.

Comparative Examples Z1 to Z3

Respective batteries were fabricated in the same manner as described in Examples A2 to A4 above, except that a binder resin represented by the following chemical formula (8) (which has a weight average molecular weight of 50,000 and is hereinafter also referred to as "binder resin Z") was used in place of the precursor of the binder resin A.

The batteries fabricated in this manner are hereinafter referred to as Comparative Batteries Z1 to Z3, respectively.

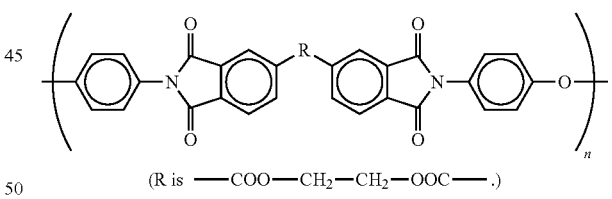

Chemical Formula (8)

(R is —COO—$CH_2$—$CH_2$—OOC—.)

Comparative Example Z4

A battery was fabricated in the same manner as described in Example A1 above, except that the average particle size of the negative electrode active material particles used was 2.5 μm.

The battery fabricated in this manner is hereinafter referred to as Comparative Battery Z4.

Comparative Example Z5

A battery was fabricated in the same manner as described in Comparative Example Z4 above, except that the binder resin Z was used in place of the precursor of the binder resin A.

The battery fabricated in this manner is hereinafter referred to as Comparative Battery Z5.

Experiment 1

The initial charge-discharge efficiency and cycle life were studied for each of Batteries A1 to A4 and Comparative Batteries Z1 to Z5. The results are shown in Table 1 below. In Table 1, the initial charge-discharge efficiencies are the values obtained by dividing the discharge capacity at the first cycle by the charge capacity at the first cycle. The cycle life is the number of cycles at which the capacity retention ratio (a value obtained by dividing the discharge capacity at the n-th cycle by the discharge capacity at the first cycle) of the battery has reached 70%, and the greater the numerical value is, the better the performance.

Charge-Discharge Conditions
  Charge Conditions for the First Cycle
  Each of the batteries was charged at a constant current of 50 mA for 4 hours, thereafter charged at a constant current of 200 mA until the battery voltage reached 4.25 V, and further charged at a constant voltage of 4.25 V until the current value reached 50 mA.
  Discharge Conditions for the First Cycle
  Each of the batteries was discharged at a constant current of 200 mA until the battery voltage reached 2.75 V.
  Charge Conditions for the Second Cycle Onward
  Each of the batteries was charged at a constant current of 1000 mA until the battery voltage reached 4.25 V and thereafter charged at a constant voltage of 4.25 V until the current value reached 50 mA.
  Discharge Conditions for the Second Cycle Onward
  Each of the batteries was discharged at a constant current of 1000 mA until the battery voltage reached 2.75 V.

TABLE 1

| Battery | Binder resin | Average particle size (μm) | Initial charge-discharge efficiency (%) | Cycle life (times) |
|---|---|---|---|---|
| A1 | A | 20 | 85 | 180 |
| A2 | A | 15 | 86 | 200 |
| Z1 | Z |  | 85 | 102 |
| A3 | A | 10 | 85 | 178 |
| Z2 | Z |  | 86 | 150 |
| A4 | A | 5 | 85 | 166 |
| Z3 | Z |  | 84 | 132 |
| Z4 | A | 2.5 | 86 | 125 |
| Z5 | Z |  | 85 | 115 |

The results shown in Table 1 clearly demonstrate that Batteries A1 to A4 of the invention, which employed the binder resin A, exhibited approximately the same initial charge-discharge efficiencies Comparative Batteries Z1 to Z3, which employed the binder resin Z, but remarkably improved cycle lifetimes over Comparative Batteries Z1 to Z3. This is believed to be due to the following reason.

In Comparative Batteries Z1 to Z3, which employ the binder resin Z, the binder itself fractures or the peeling of the negative electrode active material and the negative electrode current collector occurs at the interfaces with the binder when charge-discharge cycling is repeated, because the strength of the binder resin itself and the binding performance are insufficient. Consequently, the current collection structure within the negative electrode active material layer is broken. In contrast, Batteries A1 to A4 of the invention, which employ the binder resin A, can prevent the binder itself from fracturing and inhibit the negative electrode active material and the negative electrode current collector from peeling off at the interfaces with the binder even when charge-discharge cycling is repeated, because the strength of the binder resin itself and the binding performance are improved remarkably. As a result, the current collection structure within the negative electrode active material layer is prevented from breaking (i.e., the electron conductivity inside the negative electrode is prevented from deteriorating).

Nevertheless, it was observed that Comparative Battery Z4, which employed the binder resin A and the negative electrode active material having an average particle size of less than 5 μm (2.5 μm specifically) showed a less cycle lifetime than Comparative Batteries Z2 and Z3, although it showed a slight improvement in cycle lifetime over Comparative Battery Z4, which employed the binder resin Z and the negative electrode active material having an average particle size of 2.5 μm. The reason is believed to be that since Comparative Battery Z4 had an extremely small average particle size, the specific surface area per weight was large, and accordingly the alteration area of the negative electrode active material particles due to charge-discharge reactions was also large.

As for the case that the average particle size of the negative electrode active material is 5 μm or greater, Battery A4 of the invention, which has an average particle size of 5 μm, showed a slightly less cycle lifetime than Batteries A1 to A3 of the invention, in which the average particle size is from 10 μm to 20 μm. Therefore, it is more preferable that the average particle size of the negative electrode active material be within the range of from 10 μm to 20 μm.

The reason is as follows. An excessively small average particle size of the negative electrode active material particles results in a large specific surface area per weight, leading to a large alteration area of the negative electrode active material particles originating from charge-discharge reactions. On the other hand, an excessively large average particle size of the negative electrode active material particles leads to defects such as streaks and scratches when applying the active material.

Experiment 2

The physical properties (imidization ratio and glass transition temperature) of the binder resin A were measured.

For the measurement, the binder precursor solution a alone was dried in the air at 120° C., as in the conditions for preparing the negative electrode, and was thereafter heat-treated under an argon atmosphere at 400° C. for 10 hours, to thereby prepare a block of binder resin A.

The imidization ratio was determined by IR spectroscopy, and it was found that no peak due to acid amide sites was observed with the block of the heat-treated binder resin A and that the imidization ratio was 100%.

The glass transition temperature as determined by a DSC (differential scanning calorimetry) measurement was 300° C.

Second Group of Examples

In the second group of examples, a study was conducted about the effects of the type of binder resin on battery performance.

Example B

A battery was fabricated in the same manner as described in Example A4 in the First Group of Examples above, except that a binder resin represented by the following chemical formula (9) (which had a weight average molecular weight of 50,000 and is hereinafter also referred to as "binder resin B") was used in place of the binder resin A. The binder resin B may be prepared by using 4,4'-methylenedianiline represented by the following chemical formula (10) when preparing the binder precursor solution a, in place of m-phenylenediamine represented by the foregoing chemical formula (6).

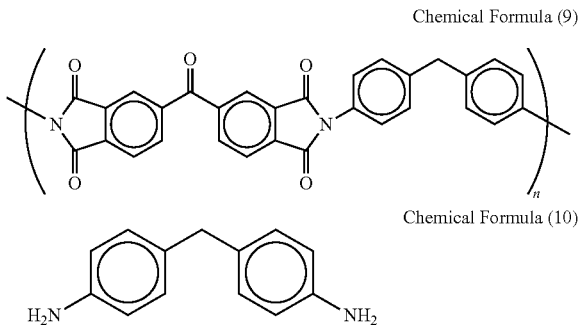

Chemical Formula (9)

Chemical Formula (10)

The battery fabricated in this manner is hereinafter referred to as Battery B of the invention.

Experiment 1

The initial charge-discharge efficiency and cycle life were studied for Battery B of the invention. The results are shown in Table 2 below. Table 2 also shows the initial charge-discharge efficiency and cycle life of Battery A4 of the invention. The conditions of the experiment were the same as those in the foregoing Experiment 1 of the First Group of Examples above.

TABLE 2

| Battery | Binder resin | Average particle size (μm) | Initial charge-discharge efficiency (%) | Cycle life (times) |
| --- | --- | --- | --- | --- |
| A4 | A | 5 | 85 | 166 |
| B | B |   | 84 | 165 |

The results shown in Table 2 clearly demonstrate that Battery B of the invention achieved substantially the same level of the initial charge-discharge efficiency and cycle lifetime as that of Battery A4 of the invention. It is therefore understood that the use of the binder resin B is possible in place of the binder resin A.

Experiment 2

The physical properties (imidization ratio and glass transition temperature) of the binder resin B were measured in the same manner as described in the foregoing Experiment 2 of the First Group of Examples.

As a result, it was found that the imidization ratio of the binder resin B was 100% and the glass transition temperature was 275° C.

Third Group of Examples

In the third group of examples, a study was conducted about the effects of the weight average molecular weight of binder resin on battery performance.

Example C

A battery was fabricated in the same manner as described in the foregoing Example A4 in the First Group of Examples above, except for the use of a binder resin having the same structure as that of the binder resin B but a weight average molecular weight of 300,000 (hereinafter also referred to as "binder resin C").

The battery fabricated in this manner is hereinafter referred to as Battery C of the invention.

Experiment 1

The initial charge-discharge efficiency and cycle life were studied for Battery C of the invention. The results are shown in Table 3 below. Table 3 also shows the initial charge-discharge efficiency and cycle life of Battery B of the invention. The conditions of the experiment were the same as those in the foregoing Experiment 1 of the First Group of Examples above.

TABLE 3

| Battery | Binder resin (weight average molecular weight) | Average particle size (μm) | Initial charge-discharge efficiency (%) | Cycle life (times) |
| --- | --- | --- | --- | --- |
| B | B (50,000) | 5 | 84 | 165 |
| C | C (300,000) |   | 74 | 162 |

The results shown in Table 3 clearly demonstrate that Battery C of the invention achieved substantially the same level of cycle lifetime as that of Battery B of the invention, but it showed a lower initial charge-discharge efficiency. This is believed to be due to the following reason.

Since the binder resin C used for Battery C of the invention has a large weight average molecular weight, the molecular chain is long and the binder exists continuously in the negative electrode active material layer. This means that the binder is present in such a state that it covers the surfaces of the negative electrode active material particles, reducing the area in which the negative electrode active material surface comes into contact with the non-aqueous electrolyte and reducing the contact points of the negative electrode active material particles with one another and the contact points between the negative electrode current collector and the negative electrode active material particles. As a result, the lithium ion conductivity and the electron conductivity in the negative electrode active material layer become poor.

In contrast, the binder resin B used for Battery B of the invention has a small weight average molecular weight, and the binder resin does not exist continuously in negative electrode active material layer. This makes it possible to prevent the negative electrode binder resin from covering the negative electrode active material particle surfaces in the negative electrode active material layer, to inhibit the decrease of the area of the negative electrode active material surface that comes into contact with the non-aqueous electrolyte, and to inhibit the decreases of the contact points of the negative electrode active material particles with one another and the contact points between the negative electrode current collector and the negative electrode active material particles. As a result, it is believed that the lithium ion conductivity and the electron conductivity in the negative electrode active material layer can be prevented from lowering.

Therefore, it is more preferable that the weight average molecular weight of the binder resin is smaller. A study conducted by the present inventors has found that a preferable weight average molecular weight of the binder resin is 100,000 or less.

Experiment 2

The physical properties (imidization ratio and glass transition temperature) of the binder resin C were measured in the same manner as described in the foregoing Experiment 2 of the First Group of Examples.

As a result, it was found that the imidization ratio of the binder resin C was 100% and the glass transition temperature was 275° C.

Fourth Group of Examples

In the fourth group of examples, a study was conducted about the effects of the roughening process for the negative electrode current collector on battery performance.

Example D

A battery was fabricated in the same manner as described in the foregoing Example A2 in the First Group of Examples, except that a 18 μm-thick pressure-rolled Corson alloy foil that had not been subjected to a roughening process (surface roughness Ra: 0.08 μm, mean profile peak spacing S: 4.3 μm) was used as the negative electrode current collector.

The battery fabricated in this manner is hereinafter referred to as Battery D of the invention.

Comparative Example Y

A battery was fabricated in the same manner as described in the foregoing Comparative Example Z1 in the First Group of Examples, except that a 18 μm-thick pressure-rolled Corson alloy foil that had not been subjected to a roughening process (surface roughness Ra: 0.08 μm, mean profile peak spacing S: 4.3 μm) was used as the negative electrode current collector.

The battery fabricated in this manner is hereinafter referred to as Comparative Battery Y.

Experiment

The initial charge-discharge efficiency and cycle life were studied for Battery D of the invention and Comparative Battery Y. The results are shown in Table 4 below. Table 4 also shows the initial charge-discharge efficiency and cycle life of Battery A2 of the invention and Comparative Battery Z1. The conditions of the experiment were the same as those in the foregoing Experiment of the First Group of Examples above.

TABLE 4

| Battery | Binder resin | Average particle size (μm) | Roughening process | Initial charge-discharge efficiency (%) | Cycle life (times) |
|---|---|---|---|---|---|
| A2 | A | 15 | Yes | 86 | 200 |
| D | | | No | 85 | 186 |
| Z1 | Z | | Yes | 85 | 102 |
| Y | | | No | 84 | 45 |

The results shown in Table 4 clearly demonstrate that Battery D of the invention, which employed a negative electrode current collector that was not subjected to a roughening process, showed a slightly shorter cycle lifetime than Battery A2 of the invention, which employed a negative electrode current collector that was subjected to a roughening process, and that Comparative Battery Y, which also employed a negative electrode current collector that was not subjected to a roughening process, showed a considerably shorter cycle lifetime than Comparative Battery Z1, which employed a negative electrode current collector that was subjected to a roughening process.

The reason is believed to be as follows. The binder resin A itself has high strength and also shows good binding performance; therefore, it can inhibit the electron conductivity inside the negative electrode from deteriorating due to repeated charge-discharge cycling even when using a negative electrode current collector that have not been subjected to a roughening process. In contrast, the binder resin Z itself has low strength and also shows poor binding performance; therefore, when using a negative electrode current collector that have not been subjected to a roughening process, the battery suffers from a considerable deterioration in the electron conductivity inside the negative electrode resulting from repeated charge-discharge cycling.

Fifth Group of Examples

In the fifth group of examples, a study was conducted about the effects of the positive/negative electrode theoretical capacity ratio on battery performance.

Example E1

A battery was fabricated in the same manner as described in Example A2 of the First Group of Examples, except that the amount of the negative electrode active material applied was set at 6.4 mg/cm².

The battery fabricated in this manner is hereinafter referred to as Battery E1 of the invention.

Example E2

A battery was fabricated in the same manner as described in Example A2 of the First Group of Examples, except that the amount of the negative electrode active material applied was set at 3.4 mg/cm².

The battery fabricated in this manner is hereinafter referred to as Battery E2 of the invention.

Experiment

The theoretical electrical capacity ratio of the positive electrode to the negative electrode (hereinafter referred to as "positive/negative electrode theoretical electrical capacity ratio") was determined for each of the just-described Batteries E1 and E2 of the invention as well as the previously-described Battery A2 of the invention, using the following Equation (3). The batteries were also charged and discharged under the same charge-discharge conditions set out in Experiment 1 described in the First Group of Examples, to determine the initial charge-discharge efficiency and the cycle life. The results are shown in Table 5 below.

In calculating the positive/negative electrode theoretical electrical capacity ratio, the theoretical electrical capacity of the negative electrode active material (silicon powder) was assumed to be 4,195 mAh/g, and the theoretical electrical capacity of the positive electrode active material (a mixture of 3:7 weight ratio of $LiCoO_2$ and $LiNi_{1/3}Mn_{1/3}Co_{1/3}O_2$) was assumed to be 275.0 mAh/g. In calculating the theoretical electrical capacity ratio of the positive electrode active material, the theoretical electrical capacity of the LiCoO$_2$ was assumed to be 273.8 mAh/g, and the theoretical electrical capacity of LiNi$_{1/3}$Mn$_{1/3}$Co$_{1/3}$O$_2$ was assumed to be 277.8 mAh/g.

Positive/negative electrode theoretical capacity ratio=mass of positive electrode active material per unit area (g/cm$^2$)×theoretical electrical capacity of positive electrode active material (mAh/g)/mass of negative electrode active material per unit area (g/cm$^2$)×theoretical electrical capacity of negative electrode active material (mAh/g)   Eq. (3)

TABLE 5

| Battery | Binder resin | Amount of negative electrode active material (mg/cm$^2$) | Amount of positive electrode active material (mg/cm$^2$) | Theoretical electrical capacity ratio | Initial charge-discharge efficiency (%) | Cycle life (times) |
|---|---|---|---|---|---|---|
| E1 | A | 6.4 | 48 | 0.51 | 83 | 214 |
| A2 |   | 5.6 |    | 0.59 | 86 | 200 |
| E2 |   | 3.4 |    | 0.97 | 88 | 165 |

The results shown in Table 5 clearly demonstrate that Batteries E1 and E2 as well as A2 of the invention, which had positive/negative electrode theoretical electrical capacity ratios of 1.2 or less, exhibited high initial charge-discharge efficiencies and long cycle life. However, Battery E2 of the invention, which had a positive/negative electrode theoretical electrical capacity ratio of 0.97, showed a somewhat shorter cycle lifetime than Batteries A2 and E1 of the invention, which had positive/negative electrode theoretical electrical capacity ratios of 0.59 and 0.51, respectively. That is, the cycle life tends to be shorter when the positive/negative theoretical electrical capacity ratio is set to be greater. The present inventors conducted a study on this matter and as a result found that it is desirable that the positive/negative electrode theoretical electrical capacity ratio be 1.2 or less.

Sixth Group of Examples

In the sixth group of examples, a study was conducted about the effects of the positive/negative electrode theoretical electrical capacity ratio and the kind of positive electrode active material on battery performance.

Example F1

A battery was fabricated in the same manner as described in Example A2 of the First Group of Examples, except that LiCoO$_2$ alone was used as the positive electrode active material and that the amount of the positive electrode active material applied was set at 53 mg/cm$^2$.

The battery fabricated in this manner is hereinafter referred to as Battery F1 of the invention.

Example F2

A battery was fabricated in the same manner as described in the just-described Example F1 of invention, except that the amount of the negative electrode active material applied was set at 3.4 mg/cm$^2$.

The battery fabricated in this manner is hereinafter referred to as Battery F2 of the invention.

Experiment

The theoretical electrical capacity ratio of the positive electrode to the negative electrode (hereinafter also referred to as "positive/negative electrode theoretical electrical capacity ratio") was determined for each of the just-described Batteries F1 and F2 of the invention using the above-described Equation (3). The batteries were also charged and discharged under the same charge-discharge conditions set out in Experiment 1 described in the First Group of Examples, to determine the initial charge-discharge efficiency and the cycle life. The results are shown in Table 6 below. Table 6 also shows the initial charge-discharge efficiency and cycle life of Battery A2 of the invention.

TABLE 6

| Battery | Binder resin | Amount of negative electrode active material (mg/cm$^2$) | Positive electrode active material layer | | Theoretical electrical capacity ratio | Initial charge-discharge efficiency (%) | Cycle life (times) |
| | | | Amount of positive electrode active material (mg/cm$^2$) | Positive electrode active material (ratio) | | | |
|---|---|---|---|---|---|---|---|
| A2 | A | 5.6 | 48 | LiCoO$_2$ + LiNi$_{1/3}$Mn$_{1/3}$Co$_{1/3}$O$_2$ (7:3) | 0.59 | 86 | 200 |
| F1 |   |   | 53 | LiCoO$_2$ | 0.65 | 86 | 191 |
| F2 |   | 3.4 |   | LiCoO$_2$ | 1.06 | 87 | 154 |

The results shown in Table 6 clearly demonstrate that Batteries F1 and F2 as well as A2 of the invention, which had positive/negative electrode theoretical electrical capacity ratios of 1.2 or less, exhibited high initial charge-discharge efficiencies and long cycle lifetimes. However, Battery F2 of the invention, which had a positive/negative electrode theoretical electrical capacity ratio of 1.06, showed a somewhat shorter cycle lifetime than Batteries A2 and F1 of the invention, which had positive/negative electrode theoretical electrical capacity ratios of 0.59 and 0.65, respectively. Therefore, as shown in Experiment in the Fifth Group of Examples above, when the positive/negative electrode theoretical electrical capacity ratio is greater, the cycle lifetime tends to be shorter. Therefore, it is desirable that the positive/negative electrode theoretical electrical capacity ratio be 1.2 or less.

The cycle life tends to be longer when a mixture of LiCoO$_2$ and LiNi$_{1/3}$Mn$_{1/3}$Co$_{1/3}$O$_2$ is used as the positive electrode active material than when LiCoO$_2$ alone is used as the positive electrode active material. Therefore, it is preferable that the positive electrode active material be a lithium-transition metal composite oxide represented by the chemical formula Li$_a$Ni$_x$Mn$_y$Co$_z$O$_2$ (wherein $0 \leq a \leq 1$, $x+y+z=1$, $0 \leq x \leq 1$, $0 \leq y \leq 1$, and $0 \leq z \leq 1$).

Seventh Group of Examples

In the seventh group of examples, a study was conducted about the effects of the crystallite size of the negative electrode active material on battery performance.

Example G1

A battery was fabricated in the same manner as described in Example A2 of the First Group of Examples, except that polycrystalline silicon particles prepared according to the following method were used as the negative electrode active material.

First, a polycrystalline silicon ingot was prepared by thermal reduction. Specifically, silicon seeds placed in a metal reactor (reducing furnace) were heated to 800° C. by passing electric current therethrough, and a mixed gas of hydrogen and a gas vapor of high-purity monosilane ($SiH_4$) was flowed therethrough so that polycrystalline silicon was deposited on the surfaces of the silicon seeds. Thereby, a polycrystalline silicon ingot was formed into a thick rod shape.

Next, the polycrystalline silicon ingot was pulverized and classified to prepare polycrystalline silicon particles (i.e., the negative electrode active material) having a purity of 99%. The polycrystalline silicon particles had a crystallite size of 34 nm and an average particle size of 15 μm.

The crystallite size was calculated from the half-width of silicon (111) peak measured by a powder X-ray diffraction analysis, using Scherrer's formula.

The battery fabricated in this manner is hereinafter referred to as Battery G1 of the invention.

Example G2

A battery was fabricated in the same manner as described in Example G1 above, except that the heating temperature for the silicon seeds was set at 1000° C. when preparing the polycrystalline silicon, and that a high purity trichlorosilane ($SiHCl_3$) gas was used in place of a high purity monosilane ($SiH_4$) gas.

The crystallite size and the average particle size of the polycrystalline silicon prepared from the trichlorosilane ($SiHCl_3$) gas were also determined in the same manner as described in Example G1. The crystallite size was 62 nm and the average particle size was 15 μm.

The battery fabricated in this manner is hereinafter referred to as Battery G2 of the invention.

Experiment

Batteries G1 and G2 of the invention were charged and discharged under the same conditions as set out in Experiment 1 described in the First Group of Examples, to determine the initial charge-discharge efficiency and the cycle life for each battery. The results are shown in Table 7 below. Table 7 also shows the initial charge-discharge efficiency and cycle life of Battery A2 of the invention.

TABLE 7

| Battery | Crystallite size of negative electrode active material (nm) | Initial charge-discharge efficiency (%) | Cycle life (times) |
|---|---|---|---|
| G1 | 34 | 85 | 430 |
| G2 | 62 | 86 | 350 |
| A2 | — (Single crystal) | 86 | 200 |

The results shown in Table 7 clearly demonstrate that Batteries G1 and G2 of the invention, which employed polycrystalline silicon particles as the negative electrode active material, exhibited better cycle performance than Battery A2 of the invention, which employed monocrystalline silicon particles as the negative electrode active material. This is believed to be due to the following reason.

Polycrystalline silicon particles have many crystallites in each particle, and the orientations of the crystallites are disordered. For this reason, polycrystalline silicon particles are less susceptible to fractures than monocrystalline silicon particles. Therefore, Batteries G1 and G2 of the invention, which used polycrystalline silicon particles as the negative electrode active material, can prevent the new surfaces that are highly reactive with the non-aqueous electrolyte solution from increasing during charge-discharge reactions and inhibit expansion associated with the alteration of the negative electrode active material particles originating from the new surfaces due to the side reactions with the non-aqueous electrolyte solution. As a result, deterioration of the negative electrode active material and breakage of the current collection structure of the negative electrode active material layer are prevented.

On the other hand, Battery A2 of the invention, which used monocrystalline silicon particles as the negative electrode active material, suffers from an increase in the new surfaces that are highly reactive with the non-aqueous electrolyte solution during charge-discharge reactions, and undergoes expansion associated with the alteration of the negative electrode active material particles originating from the new surfaces because of the side reactions with the non-aqueous electrolyte solution. As a result, the deterioration of the negative electrode active material and the breakage of the current collection structure of the negative electrode active material layer are promoted.

The results shown in Table 7 also clearly demonstrate that Battery G1 of the invention, which employed monosilane ($SiH_4$) as the source material for preparing the polycrystalline silicon, exhibited better cycle performance than Battery G2 of the invention, which employed trichlorosilane ($SiHCl_3$) as the source material for preparing the polycrystalline silicon. This is believed to be due to the following reason.

The reaction temperature for depositing the polycrystalline silicon ingot may be lower when monosilane ($SiH_4$) is used as the source material for preparing the polycrystalline silicon than when trichlorosilane ($SiHCl_3$) is used as the source material for preparing the polycrystalline silicon. Therefore, the use of monosilane ($SiH_4$) makes it possible to obtain a polycrystalline silicon ingot with a smaller crystallite size.

The silicon particles with a smaller crystallite size have more grain boundaries within each one particle and more crystallite surfaces exposed on the particle surface, so they have many very small surface irregularities. Since the binder according to the present invention can get into even such very small surface irregularities, the silicon particles with a smaller crystallite size, which have small but many surface irregularities, can exhibit more significant anchoring effect between the binder and the negative electrode active material particles. Hence, Battery G1 of the invention, which employed monosilane as the source material for preparing the polycrystalline silicon (i.e., which employed the silicon particles with a smaller crystallite size as the negative electrode active material), was able to obtain stronger adhesion and therefore achieved better cycle performance than Battery G2 of the invention, which employed trichlorosilane as the source material for preparing the polycrystalline silicon (i.e., which employed the silicon particles with a slightly large crystallite size as the negative electrode active material crystallite size).

Eighth Group of Examples

In the eighth group of examples, a study was conducted about the effects of addition of conductive agent to the interior of the negative electrode active material layer on battery performance.

Example H1

A battery was fabricated in the same manner as described in Example A2 of the First Group of Examples, except that graphite powder (average particle size: 3.5 μm) as the negative electrode conductive agent was added in an amount of 3 weight % with respect to the negative electrode active material when preparing the negative electrode active material slurry.

The battery fabricated in this manner is hereinafter referred to as Battery H1 of the invention.

Examples H2 to H10

Respective batteries were fabricated in the same manner as described in Example H1 above, except that the average particle sizes and the amounts (weight ratios relative to the negative electrode active material particles) of the graphite powders added were as set forth in Table 8 blow.

The batteries fabricated in this manner are hereinafter referred to as Batteries H2 to H10 of the invention, respectively.

Experiment

Batteries H1 to H10 of the invention were charged and discharged under the same conditions as set out in the foregoing Experiment 1 described in the First Group of Examples, to determine the initial charge-discharge efficiency and the cycle life for each battery. The results are shown in Table 8 below. Table 8 also shows the initial charge-discharge efficiency and cycle life of Battery A2 of the invention.

TABLE 8

| Battery | Negative electrode conductive agent | | Initial charge-discharge efficiency (%) | Cycle life (times) |
|---|---|---|---|---|
| | Average particle size (μm) | Amount added (wt. %) | | |
| H1 | 1 | 3 | 85 | 193 |
| H2 | 3.5 | | 88 | 231 |
| H3 | 5 | | 87 | 214 |
| H4 | 10 | | 87 | 210 |
| H5 | 15 | | 86 | 209 |
| H6 | 20 | | 85 | 195 |
| H7 | 3.5 | 1 | 86 | 201 |
| H8 | | 10 | 88 | 208 |
| H9 | | 20 | 87 | 202 |
| H10 | | 25 | 85 | 174 |

TABLE 8-continued

| Battery | Negative electrode conductive agent | | Initial charge-discharge efficiency (%) | Cycle life (times) |
|---|---|---|---|---|
| | Average particle size (μm) | Amount added (wt. %) | | |
| A2 | — | Not added | 86 | 200 |

The results shown in Table 8 clearly demonstrate that Batteries H2 to H5, H8, and H9 of the invention, which contained graphite powder having an average particle size of from 3 μm to 15 μm as the negative electrode conductive agent in an amount of from 3 weight % to 20 weight %, exhibited better cycle performance than Batteries H1, H6, H7, and H10 of the invention, in which the average particle sizes and the amounts of the graphite powder were outside the just-mentioned ranges.

It is believed that adding graphite powder as the negative electrode conductive agent within the just-mentioned ranges prevented the adhesion within the negative electrode active material layer from deteriorating considerably, and permitted the graphite powder to form a conductive network. Therefore, the electron conductivity within the negative electrode active material layer was improved, and as a result, excellent charge-discharge characteristics were obtained.

Ninth Group of Examples

In the ninth group of examples, a study was conducted about the effects of the negative electrode heat-treating temperature on battery performance.

Examples J1 to J4

Respective batteries were fabricated in the same manner as described in the foregoing Example A4 in the First Group of Examples, except that the negative electrodes were subjected to a heat treatment at 280° C. for 10 hours under an argon atmosphere, a heat treatment at 300° C. for 10 hours under an argon atmosphere, a heat treatment at 420° C. for 10 hours under an argon atmosphere, and a heat treatment at 470° C. for 10 hours under an argon atmosphere, respectively, in place of the heat treatment at 400° C. for 10 hours under an argon atmosphere.

The batteries fabricated in this manner are hereinafter referred to as Batteries J1 to J4 of the invention, respectively.

Examples J5 to J8

Respective batteries were fabricated in the same manner as described in the foregoing Example B in the Second Group of Examples, except that the negative electrodes were subjected to a heat treatment at 255° C. for 10 hours under an argon atmosphere, a heat treatment at 275° C. for 10 hours under an argon atmosphere, a heat treatment at 420° C. for 10 hours under an argon atmosphere, and a heat treatment at 470° C. for 10 hours under an argon atmosphere, respectively, in place of the heat treatment at 400° C. for 10 hours under an argon atmosphere.

The batteries fabricated in this manner are hereinafter referred to as Batteries J5 to J8 of the invention, respectively.

Examples J9 to J12

Respective batteries were fabricated in the same manner as described in the foregoing Example C in the Third Group of Examples, except that the negative electrodes were subjected to a heat treatment at 255° C. for 10 hours under an argon atmosphere, a heat treatment at 275° C. for 10 hours under an argon atmosphere, a heat treatment at 420° C. for 10 hours under an argon atmosphere, and a heat treatment at 470° C. for 10 hours under an argon atmosphere, respectively, in place of the heat treatment at 400° C. for 10 hours under an argon atmosphere.

The batteries fabricated in this manner are hereinafter referred to as Batteries J9 to J12 of the invention, respectively.

Experiment

Batteries J1 to J12 of the invention were charged and discharged under the same conditions as set out in the foregoing Experiment 1 described in the First Group of Examples, to determine the initial charge-discharge efficiency and the cycle life for each battery. The results are shown in Table 9 below. Table 9 also shows the initial charge-discharge efficiency and cycle life of Batteries A4, B, and C of the invention.

TABLE 9

| Battery | Negative electrode binder Binder | Glass transition temperature (° C.) | Negative electrode heat-treatment Temperature (° C.) | Duration (h) | Initial charge-discharge efficiency (%) | Cycle life (times) |
|---|---|---|---|---|---|---|
| J1 | A | 295 | 280 | 10 | 82 | 152 |
| J2 | A | | 300 | | 84 | 158 |
| A4 | A | | 400 | | 85 | 166 |
| J3 | A | | 420 | | 86 | 165 |
| J4 | A | | 470 | | 82 | 153 |
| J5 | B | 275 | 255 | | 80 | 151 |
| J6 | B | | 275 | | 82 | 156 |
| B | B | | 400 | | 84 | 165 |
| J7 | B | | 420 | | 86 | 162 |
| J8 | B | | 470 | | 81 | 152 |
| J9 | C | 275 | 255 | | 70 | 151 |
| J10 | C | | 275 | | 72 | 158 |
| C | C | | 400 | | 74 | 162 |
| J11 | C | | 420 | | 76 | 159 |
| J12 | C | | 470 | | 71 | 152 |

The results shown in Table 9 clearly demonstrate that Batteries A4, J2, J3, B, J6, J7, C, J10, and J11 of the invention, in which the negative electrodes were heat-treated at temperatures higher than the glass transition temperatures of the negative electrode binders but equal to or less than 450° C., exhibited better cycle performance than Batteries of the invention J1, J4, J5, J8, J9, and J12, in which the negative electrodes were heat-treated at temperatures lower than the glass transition temperatures of the negative electrode binders, or higher than 450° C.

It is believed that when the electrode heat treatment was conducted at a temperature higher than the glass transition temperature of the negative electrode binder, the binder underwent heat-bonding so that the binder got into the surface irregularities of the silicon particles and the surface irregularities of the negative electrode current collector; as a result, the anchoring effect originating from the binder was exerted more significantly and high adhesion was exhibited.

On the other hand, it is believed that when the electrode heat treatment was conducted at a temperature higher than 450° C., the binder underwent thermal decomposition, so the strength of the binder significantly lowered, resulting in deterioration in the adhesion.

Other Embodiments (1) Although in the foregoing examples, R of the polyimide resin represented by the chemical formula (1) was illustrated to be a functional group represented by the chemical formula (2) or the chemical formula (3), it is sufficient that R contain at least a benzene ring. Examples include functional groups represented by the following chemical formulae (11) to (14).

Chemical Formula (11)

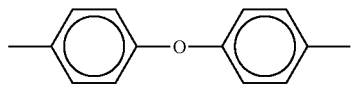

-continued

Chemical Formula (12)

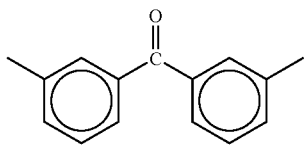

Chemical Formula (13)

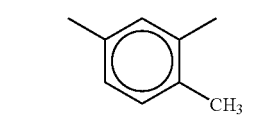

Chemical Formula (14)

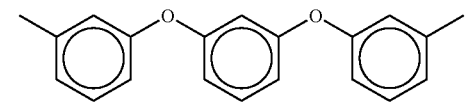

(2) Although silicon particles were used as the negative electrode active material particles in the foregoing examples, it is of course possible to use silicon alloy particles as well as a mixture of silicon particles and silicon alloy particles, as the negative electrode active material particles. It is also possible to add carbonaceous material particles and the like to the foregoing particles. In addition, the use of tin oxide, metallic lithium, and mixtures thereof is also possible.

(3) The lithium salt of the electrolyte solution is not limited to $LiPF_6$, and various other substances may be used, including $LiBF_4$, $LiAsF_6$, $LiCF_3SO_3$, $LiN(C_lF_{2l+1}SO_2)(C_mF_{2m+1}SO_2)$ (where l and m are integers equal to or greater than 0), $LiC(C_pF_{2p+1}SO_2)(C_qF_{2q+1}SO_2)(CrF_{2r+1}SO_2)$ (where p, q, and r are integers equal to or greater than 1), which may be used either alone or in combination of two or more of them. Although the concentration of the lithium salt is not particularly limited, it is preferable to control the concentration of the lithium salt within the range of from 0.5 moles to 2.0 moles per 1 liter of the electrolyte solution.

(4) Although the solvents for the electrolyte solution are not particularly limited to ethylene carbonate (EC) and diethyl carbonate (DEC) mentioned above, it is preferable that the electrolyte solution contain at least one type of cyclic carbonic ester compound having a C=C unsaturated bond. Examples of such cyclic carbonic ester compounds include vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-methyl vinylene carbonate, vinyl ethylene carbonate, and divinyl ethylene carbonate. When the electrolyte solution contains a cyclic carbonic ester compound having a C=C unsaturated bond as described above, a chemically stable surface film forms on the negative electrode, preventing the deposition of the transition metal that dissolves away from the positive electrode.

In addition, in order to enhance the effect of the formation of the surface film and to improve the quality of the surface film, it is preferable that the solvent contain $CO_2$ or a carbonate containing fluorine. Examples of such solvents include fluoroethylene carbonate and trifluoromethylpropylene carbonate.

Preferable examples of the solvents for the electrolyte solution used in the present invention, to further enhance the effect of the surface film formation resulting from the cyclic carbonic ester compound having a C=C unsaturated bond, include carbonate-based solvents such as ethylene carbonate, propylene carbonate, diethyl carbonate, ethyl methyl carbonate, and dimethyl carbonate. More preferable is a combination of a cyclic carbonate and a chain carbonate.

(5) The present invention may be applied not only to liquid-type batteries but also to gelled polymer batteries. In this case, usable examples of the polymer material include polyether-based solid polymer, polycarbonate solid polymer, polyacrylonitrile-based solid polymer, oxetane-based polymer, epoxy-based polymer, and copolymers or cross-linked polymers comprising two or more of these polymers, as well as PVDF. Any of the above examples of polymer material may be used in combination with a lithium salt and a non-aqueous electrolyte to form a gelled solid electrolyte.

The present invention is suitable for driving power sources for mobile information terminals such as mobile telephones, notebook computers, and PDAs, especially for use in applications that require a high capacity. The invention is also expected to be used for high power applications that require continuous operations under high temperature conditions, such as HEVs and power tools, in which the battery operates under severe operating environments.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

What is claimed is:
1. A lithium secondary battery comprising:
a positive electrode;
a negative electrode comprising a negative electrode current collector and a negative electrode active material layer formed on the negative electrode current collector, the negative electrode active material layer comprising a binder and negative electrode active material particles containing silicon particles and/or silicon alloy particles;
a separator interposed between the electrodes; and
an electrode assembly comprising the positive electrode, the negative electrode, and the separator; and
a non-aqueous electrolyte impregnated in the electrode assembly, wherein
the binder contains a polyimide resin represented by the following chemical formula (1):

Chemical Formula (1)

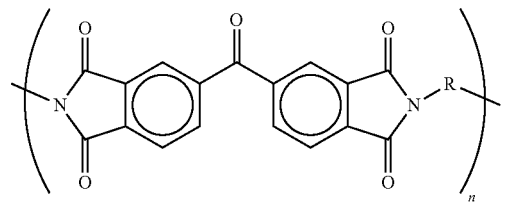

where R in the chemical formula (1) is a functional group represented by the following chemical formula (2) or (3):

Chemical Formula (2)

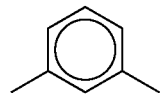

Chemical Formula (3)

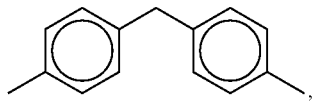

and n is within the range of from 10 to 100,000; and
the silicon particles and the silicon alloy particles have an average particle size of 5-25 μm.

2. The lithium secondary battery according to claim 1, wherein the polyimide resin represented by the chemical formula (1) has a molecular weight of 1000-100,000.

3. The lithium secondary battery according to claim 1, wherein the negative electrode current collector has a surface roughness Ra of 0.2-2 μm.

4. The lithium secondary battery according to claim 1, wherein the negative electrode current collector is selected from the group consisting of a copper foil, a copper alloy foil, a metal foil having a copper layer formed on its surface, and a metal foil having a copper alloy layer formed on its surface.

5. The lithium secondary battery according to claim 1, wherein the positive electrode contains a positive electrode active material comprising a lithium-transition metal composite oxide.

6. The lithium secondary battery according to claim 5, wherein the lithium-transition metal composite oxide is a lithium-transition metal composite oxide represented by the chemical formula $Li_aNi_xMn_yCo_zO_2$, wherein $0 \leq a \leq 1$, $x+y+z=1$, $0 \leq x \leq 1$, $0 \leq y \leq 1$, and $0 \leq z \leq 1$.

7. The lithium secondary battery according to claim 6, wherein the theoretical electrical capacity ratio of the positive electrode to the negative electrode is 0.4-1.2.

8. The lithium secondary battery according to claim 1, wherein the silicon particles and the silicon alloy particles have a crystallite size of 1-100 nm.

9. The lithium secondary battery according to claim 8, wherein the silicon particles and the silicon alloy particles are prepared by thermally decomposing or thermally reducing a material containing a silane compound.

10. The lithium secondary battery according to claim 9, wherein the silicon particles and/or the silicon alloy particles are prepared by pulverizing an ingot of silicon and/or an ingot of a silicon alloy that is/are prepared by thermally decomposing or thermally reducing a material containing a silane compound, and classifying the pulverized material.

11. The lithium secondary battery according to claim 9, wherein the silane compound is monosilane and/or trichlorosilane.

12. The lithium secondary battery according to claim 1, wherein the negative electrode active material layer contains 3 weight % to 20 weight %, based on the weight of the negative electrode active material, of graphite powder having an average particle size of from 3 μm to 15 μm.

13. The lithium secondary battery according to claim 1, wherein the negative electrode active material particles comprise silicon particles having a purity of 95-99 weight %.

* * * * *